US012605841B2

(12) United States Patent
Chang et al.

(10) Patent No.: US 12,605,841 B2
(45) Date of Patent: Apr. 21, 2026

(54) METHOD AND APPARATUS FOR TOOL MANAGEMENT IN ROBOT SYSTEM

(71) Applicant: ABB SCHWEIZ AG, Baden (CH)

(72) Inventors: Kun Chang, Shanghai (CN); Wenyao Shao, Shanghai (CN); Dianfei Xia, Shanghai (CN)

(73) Assignee: ABB Schweiz AG, Baden (CH)

( * ) Notice: Subject to any disclaimer, the term of this patent is extended or adjusted under 35 U.S.C. 154(b) by 61 days.

(21) Appl. No.: 18/576,713

(22) PCT Filed: Sep. 10, 2021

(86) PCT No.: PCT/CN2021/117711
§ 371 (c)(1),
(2) Date: Jan. 4, 2024

(87) PCT Pub. No.: WO2023/035228
PCT Pub. Date: Mar. 16, 2023

(65) Prior Publication Data
US 2024/0383145 A1      Nov. 21, 2024

(51) Int. Cl.
B25J 9/16          (2006.01)
(52) U.S. Cl.
CPC .................................. B25J 9/1692 (2013.01)
(58) Field of Classification Search
CPC ................ B25J 9/1692; G01B 21/042; G05B 2219/37021; G05B 2219/37043; G05B 2219/39021; G05B 2219/50139; G05B 2219/39024; G05B 2219/39026
See application file for complete search history.

(56) References Cited

U.S. PATENT DOCUMENTS

| | | | |
|---|---|---|---|
| 4,831,549 A | 5/1989 | Red et al. | |
| 6,199,024 B1 | 3/2001 | Bunimovich et al. | |
| 6,321,137 B1 | 11/2001 | De Smet | |
| 2007/0138374 A1* | 6/2007 | Nishibashi | B25J 17/0266 |
| | | | 74/490.1 |
| 2016/0116275 A1* | 4/2016 | Matsushita | G01B 21/042 |
| | | | 702/95 |
| 2020/0019136 A1 | 1/2020 | Li et al. | |
| 2020/0061837 A1 | 2/2020 | Gu et al. | |

FOREIGN PATENT DOCUMENTS

| | | |
|---|---|---|
| CN | 207037458 U | 2/2018 |
| CN | 111002312 A | 4/2020 |
| CN | 111216115 A | 6/2020 |
| CN | 111390911 A | 7/2020 |
| CN | 109465826 B | 8/2021 |
| CN | 112277009 B | 9/2023 |
| JP | 2011152599 A | 8/2011 |
| WO | 2020160776 A1 | 8/2020 |

* cited by examiner

*Primary Examiner* — Bao Long T Nguyen
(74) *Attorney, Agent, or Firm* — Greenberg Traurig, LLP

(57) ABSTRACT

Methods, apparatuses, systems, and computer readable media for managing a tool in a robot system. In a method, a plurality of arm positions of a robot arm of the robot system are obtained when the tool is placed under a posture on a surface of a calibration object for calibrating the tool, where the posture represents rotation parameters of the robot arm. A center of the calibration object is determined based on the plurality of arm positions. A reference position of the robot arm is generated for calibrating the tool based a position of the center and the posture.

20 Claims, 5 Drawing Sheets

200

122
210
212
220

300

310
OBTAIN A PLURALITY OF ARM POSITIONS OF A ROBOT ARM OF THE ROBOT SYSTEM WHEN THE TOOL IS PLACED UNDER A POSTURE ON A SURFACE OF A CALIBRATION OBJECT FOR CALIBRATING THE TOOL, THE POSTURE REPRESENTING ROTATION PARAMETERS OF THE ROBOT ARM

320
DETERMINE A CENTER OF THE CALIBRATION OBJECT BASED ON THE PLURALITY OF ARM POSITIONS

330
GENERATE A REFERENCE POSITION OF THE ROBOT ARM FOR CALIBRATING THE TOOL BASED A POSITION OF THE CENTER AND THE POSTURE.

300

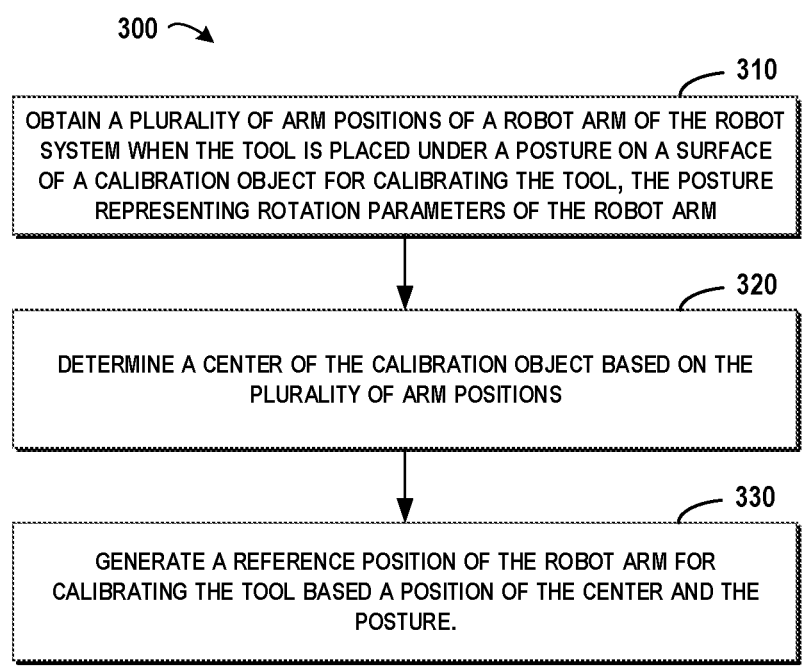

310

OBTAIN A PLURALITY OF ARM POSITIONS OF A ROBOT ARM OF THE ROBOT SYSTEM WHEN THE TOOL IS PLACED UNDER A POSTURE ON A SURFACE OF A CALIBRATION OBJECT FOR CALIBRATING THE TOOL, THE POSTURE REPRESENTING ROTATION PARAMETERS OF THE ROBOT ARM

320

DETERMINE A CENTER OF THE CALIBRATION OBJECT BASED ON THE PLURALITY OF ARM POSITIONS

330

GENERATE A REFERENCE POSITION OF THE ROBOT ARM FOR CALIBRATING THE TOOL BASED A POSITION OF THE CENTER AND THE POSTURE.

FIG. 3

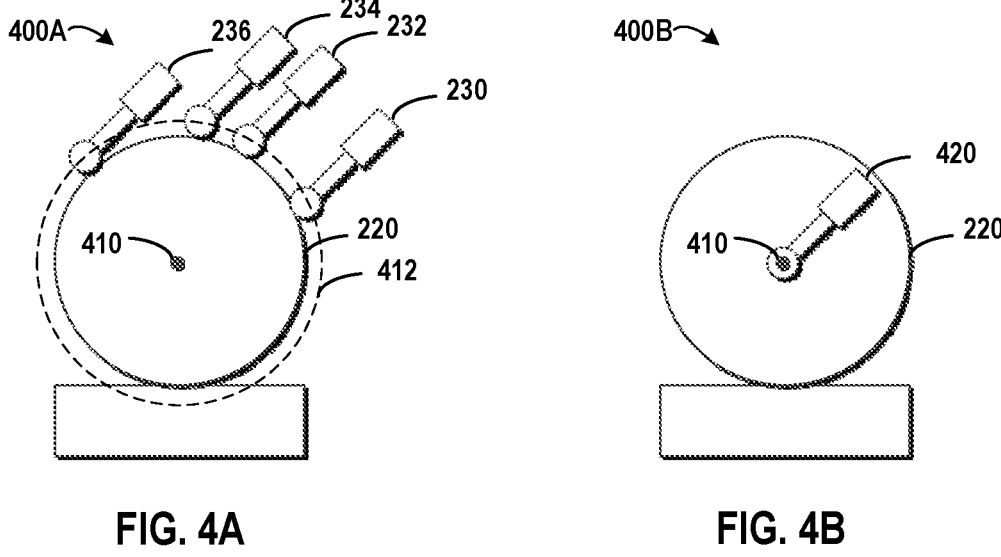

4-POINT
CALIBRATION

600

122    620

630

610

900

1000

METHOD AND APPARATUS FOR TOOL MANAGEMENT IN ROBOT SYSTEM

CROSS-REFERENCE TO RELATED APPLICATIONS

This is a national stage application claiming priority to international patent application Serial No.: PCT/CN2021/117711, filed on Sep. 10, 2021; which is herein incorporated by reference in its entirety.

FIELD

Example embodiments of the present disclosure generally relate to a robot system, and more specifically, to methods, apparatuses, systems and computer readable media for managing a tool in the robot system, such that the tool may be controlled in a more effective way.

BACKGROUND

With developments of computer and automatic control, robot systems have been widely used to process various types of objects in the manufacturing industry. For example, a tool may be equipped at an end arm of the robot system for measuring, cutting, grabbing and other operations. To achieve a high-performance in the robot system, engineers need to take much time and efforts to calibrate the tool first. There have been proposed several solutions for calibrating the tool in the robot system. However, these solutions require the engineers to implement complex operations manually so as to obtain multiple reference positions for the calibration. These operations need rich calibration knowledge and it is hard for an inexperienced engineer to calibrate the tool in the robot system independently. Therefore, it is desired to propose an easy and effective way for managing the tool in the robot system.

SUMMARY

Example embodiments of the present disclosure provide solutions for managing a tool in a robot system.

In a first aspect, example embodiments of the present disclosure provide a method for managing a robot system. The method comprises: obtaining a plurality of arm positions of a robot arm of the robot system when the tool is placed under a posture on a surface of a calibration object for calibrating the tool, the posture representing rotation parameters of the robot arm; determining a center of the calibration object based on the plurality of arm positions; and generating a reference position of the robot arm for calibrating the tool based a position of the center and the posture. Compared with conventional solutions for calibrating the tool by a calibration tool with a sharp tip, the calibration object according to the present disclosure may have a larger surface instead of only a sharp tip. During the calibration procedure, the engineer may place the to-be-calibrated tool on the surface of the calibration object easily. The calibration procedure may be easily controlled compared with the conventional solutions for placing the tool exactly at the sharp tip, and thus the calibration error that is caused by an offset between the tool and the sharp tip may be alleviated.

In some embodiments, determining the center of the calibration object comprises: determining the center of the calibration object based on a geometry relationship between the surface of the calibration object and a shape of the calibration object. With these embodiments, it is unnecessary to align the tool to the sharp tip for collecting reference positions for calibrating the tool. Instead, the tool may be place at required positions on the surface, and then the center of the calibration object may be used for determining the reference positions. Therefore, the complex calibration procedure that requires experienced engineers' manual operations may be improved by a computing procedure based on the geometry relationship between the surface and the shape of the calibration object.

In some embodiments, the shape of the calibration object comprises any of a ball, a cylinder, a cube, a cuboid, a cone, and a polyhedron, and obtaining the plurality of arm positions comprises: determining the number of the plurality of arm positions based on the shape of the calibration object; and obtaining the plurality of arm positions based on the determined number. With these embodiments, the calibration object may be manufactured in various shapes. For example, a calibration object with an appropriate shape may be selected according a surrounding area of the working environment of the robot system, and then the calibration procedure may be adjusted based on the shape of the calibration object. Therefore, the various shapes of the calibration object may provide more flexible choices for the tool calibration.

In some embodiments, generating the reference position of the robot arm comprises: generating components in the reference position related to positions based on the position of the center; and generating components in the reference position related to rotations based on rotations parameters of the robot arm. With these embodiments, components (for example, three position components and three rotation components when a position format with six degrees of freedom is adopted) may be determined in an easy and effective way.

In some embodiments, the method further comprises: generating a plurality of reference positions according to the above method; and determining, based on the plurality of reference positions, a transformation relationship between an arm coordinate of the robot arm and a Tool Center Position (TCP) coordinate of the robot system. With these embodiments, multiple reference positions (for example, four or more) may be generated by placing the tool on the surface of the calibration object under multiple postures, respectively. Therefore, the multiple reference positions may be further used for calibrating the tool. Compared with the conventional solutions for placing the tool exactly at the sharp tip of the calibration tool under multiple postures respectively, these embodiments may obtain the reference positions and calibrating the tool with simple manual operations accurately.

In some embodiments, determining the transformation relationship comprises: generating an equation based on a geometry relationship among the arm coordinate, the TCP coordinate and a base coordinate of the robot system; and determining the transformation relationship by solving the equation. With these embodiments, the technical problem of determining the transformation relationship is converted into a mathematic problem for solving the equation. Here, the equation may be easily solved by the least square method and then the transformation relationship may be determined in a fast and effective way.

In some embodiments, calibrating the tool based on the transformation relationship. With these embodiments, the tool may be calibrated in an effective way based on the determined transformation relationship.

In some embodiments, the tool comprises a probe tool and the method further comprises: determining a dimension of a target object with the calibrated tool. With these embodiments, the probe tool may be calibrated accurately and effectively, and then it may measure an accurate dimension of the target object.

In some embodiments, determining the dimension of the target object comprises: receiving a first position in the target object and a second position in the target object, respectively; and determining the dimension of the target object based on an offset between the first position and the second position. With these embodiments, due to both of the first and second positions are accurate positions measured by the calibrated probe tool, the dimension that is determined from the first and second positions is also accurate and reliable.

In some embodiments, the tool is deployed at any of the robot arm and a fixed positon associated with the robot system, and the calibration object is deployed at the other of the robot arm and the fixed position. With these embodiments, the calibration object may be deployed at a tip of the robot arm or a fixed position in the robot system based on a specific environment of the robot system. Therefore, multiple choices are provided for calibrating the tool.

In a second aspect, example embodiments of the present disclosure provide an apparatus for managing a tool in a robot system. The apparatus comprises: an obtaining unit, configured for obtaining a plurality of arm positions of a robot arm of the robot system when the tool is placed under a posture on a surface of a calibration object for calibrating the tool, the posture representing rotation parameters of the robot arm; a determining unit, configured for determining a center of the calibration object based on the plurality of arm positions; and a generating unit, configured for generating a reference position of the robot arm for calibrating the tool based a position of the center and the posture.

In some embodiments, the determining unit is further configured for: determining the center of the calibration object based on a geometry relationship between the surface of the calibration object and a shape of the calibration object.

In some embodiments, the shape of the calibration object comprises any of a ball, a cylinder, a cube, a cuboid, a cone, and a polyhedron, and the obtaining unit is further configured for: determining the number of the plurality of arm positions based on the shape of the calibration object; and obtaining the plurality of arm positions based on the determined number.

In some embodiments, the generating unit is further configured for: generating components in the reference position related to positions based on the position of the center; and generating components in the reference position related to rotations based on rotations parameters of the robot arm.

In some embodiments, the generating unit is further configured for generating a plurality of reference positions; and the apparatus further comprises: a transformation relationship determining unit, configured for determining, based on the plurality of reference positions, a transformation relationship between an arm coordinate of the robot arm and a Tool Center Position (TCP) coordinate of the robot system.

In some embodiments, the transformation relationship determining unit is further configured for: generating an equation based on a geometry relationship among the arm coordinate, the TCP coordinate and a base coordinate of the robot system; and determining the transformation relationship by solving the equation.

In some embodiments, the apparatus further comprises: a calibrating unit, configured for calibrating the tool based on the transformation relationship.

In some embodiments, the tool comprises a probe tool and the apparatus further comprises: a measuring unit configured for determining a dimension of a target object with the calibrated tool.

In some embodiments, the measure unit is further configured for: receiving a first position in the target object and a second position in the target object, respectively; and determining the dimension of the target object based on an offset between the first position and the second position.

In some embodiments, the tool is deployed at any of the robot arm and a fixed positon associated with the robot system, and the calibration object is deployed at the other of the robot arm and the fixed position.

In a third aspect, example embodiments of the present disclosure provide a system for managing a tool in a robot system. The system comprises: a computer processor coupled to a computer-readable memory unit, the memory unit comprising instructions that when executed by the computer processor implements the method for managing a tool in a robot system.

In a fourth aspect, example embodiments of the present disclosure provide a computer readable medium having instructions stored thereon, the instructions, when executed on at least one processor, cause the at least one processor to perform the method for managing a tool in a robot system.

DESCRIPTION OF DRAWINGS

FIG. 3 illustrates a flowchart of a method for managing a tool in a robot system in accordance with embodiments of the present disclosure;

FIG. 4A illustrates a schematic diagram for obtaining a plurality of arm positions of a robot arm in accordance with embodiments of the present disclosure;

FIG. 4B illustrates a schematic diagram for generating a reference position for calibrating a tool in accordance with embodiments of the present disclosure;

Throughout the drawings, the same or similar reference symbols are used to indicate the same or similar elements.

DETAILED DESCRIPTION OF EMBODIMENTS

Figures 1A, 1B:
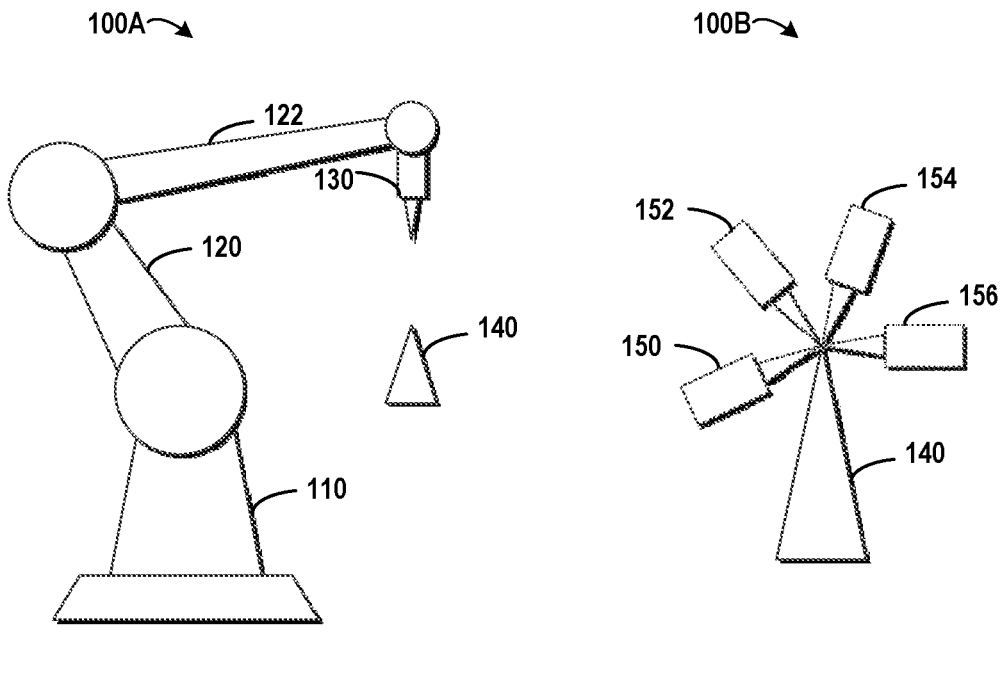
FIG. 1A illustrates a schematic diagram for a robot system in which embodiments of the present disclosure may be implemented.
FIG. 1B illustrates a schematic diagram for calibrating a tool in a robot system according to one solution.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1A to provide a general description of environment of the present disclosure. FIG. 1A illustrates a schematic diagram for a robot system 100A in which embodiments of the present disclosure may be implemented. In FIG. 1, the robot system 100A may comprise one or more arms 120, 122, and so on, where the arm 120 is connected to a base 110 of the robot system 100A via a joint, and the arm 122 is connected to the arm 120 via a joint. A tip of the end arm 122 may be equipped with a tool 130 for processing a target object, such as a raw material that is to be measured or shaped by the robot system 100A. Here, the tool 130 may include, for example, a probe tool for measuring a dimension of the target object, or a cutting tool for shaping the target object into a desired shape, and so on. Although only two arms are illustrated in FIG. 1A, the robot system 100A may include more or less arms.

In order to control the tool 130 accurately, a special calibration procedure should be run before normal operations of the robot system 100A. Various solutions are provided for calibrating the tool 130. In one solution, a calibration tool 140 is provided for the calibration procedure, and the calibration tool 140 may have a sharp tip. Reference will be made to FIG. 1B for describing the calibration procedure. FIG. 1B illustrates a schematic diagram 100B for calibrating a tool in a robot system according to one solution. During the calibration procedure, an experienced engineer may align a tip of the tool 130 to the sharp tip of the calibration tool 140 under multiple postures. For example, the tool 130 may be placed under postures 150, 152, 154 and 156 for making the tool tip to touch the sharp tip of the calibration tip 140.

At this point, four reference positions may be read respectively from the robot system 100A for calibrating the tool 130. Further, the tool 130 may be calibrated based on a four-point-calibration solution and/or another solution. However, as both of the tool tip and the sharp tip are small and are not easy to be aligned, the calibration procedure usually includes manual errors that may potentially affect the calibration accuracy. Therefore, great errors may be involved in the calibration procedure, which leads to an uncalibrated robot system.

In order to at least partially solve the above and other potential problems, a new method for managing a tool in a robot system is provided according to embodiments of the present disclosure. In general, a calibration object having a surface is provided for calibrating the tool 130, and then engineers only need to place the tool 130 on the surface of the calibration object, instead of aligning the tool tip to the sharp tip in an accurate way. With these embodiments of the present disclosure, the complexity of the manual operations may be reduced and further errors caused by the manual operations may be alleviated.

Figure 2:
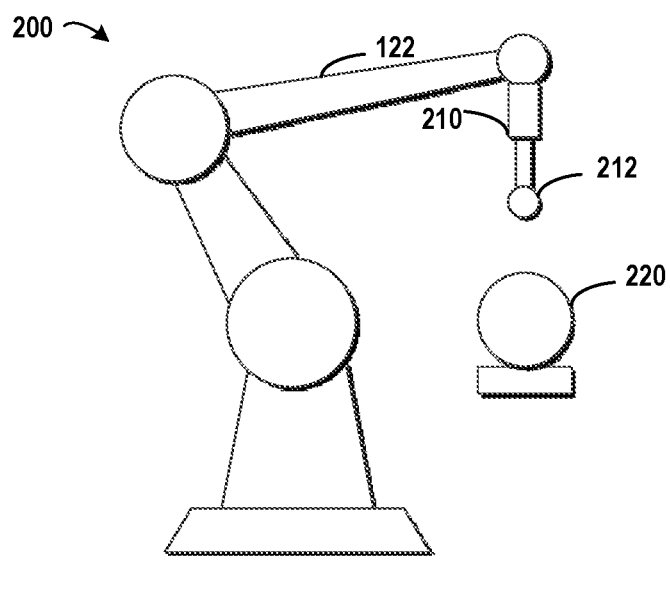
FIG. 2 illustrates a schematic diagram for collecting reference positions for calibrating a tool in a robot system in accordance with embodiments of the present disclosure.

Reference will be made to FIG. 2 for a brief of the present disclosure, here FIG. 2 illustrates a schematic diagram for collecting reference positions for calibrating a tool in a robot system 200 in accordance with embodiments of the present disclosure. It is to be understood that multiple types of tools may be equipped to the robot arm 122 and hereinafter a probe tool 210 is taken as an example for an illustration. In FIG. 2, the probe tool 210 having a ball probe 212 is equipped at the arm 122, and the probe tool 210 should be calibrated before it is used for measure a dimension of a target object. Further, a calibration object 220 (such as a ball shape) having a surface is provided for calibrating the probe tool 210. Although the calibration object 220 is illustrated with a ball shape, the calibration object 220 may have another shape such as a cylinder, a cube, a cuboid, a cone, a polyhedron, and so on.

The probe tool 210 may be controlled and moved to multiple arm positions to touch the surface of the calibration object 220 in a posture, respectively. Here, the posture may represent rotation parameters in the arm positions that are read from the robot system 200. Further, a center of the calibration object 220 (for example, a center of the ball) may be determined based on the arm positions and then the center of the calibration object 220 may be used to generate a reference position for calibrating the probe tool 210. Compared with conventional solutions for calibrating the tool by the calibration tool with the sharp tip, the calibration object 220 proposed in the present disclosure has a larger surface area instead of only the sharp tip. During the calibration procedure, the engineer may place the to-be-calibrated tool on the surface of the calibration object 220 easily. With embodiments of the present disclosure, it does not require the engineer to place the tool tip exactly at the sharp tip, and thus the calibration procedure may be easily controlled. Further, the calibration error that is caused by an offset between the tool tip and the sharp tip of the conventional calibration object 140 may be alleviated.

Hereinafter, reference will be made to FIG. 3 for more details of the present disclosure. FIG. 3 illustrates a flowchart of a method 300 for managing a tool in a robot system in accordance with embodiments of the present disclosure. At a block 310, a plurality of arm positions of a robot arm of the robot system are obtained when the tool is placed under a posture on a surface of a calibration object for calibrating the tool. Here, the posture represents rotation parameters of the robot arm. In the calibration procedure, the engineer may move the probe tool 210 to multiple arm positions that make the ball probe 212 in probe tool 210 to touch the surface of the calibration object 220. For example, the probe tool 210 may be placed on the spherical surface of the calibration object 220. At this point, the multiple arm positions may be directly read from a controller of the robot system 200.

It is to be understood that the probe tool 210 should be placed under a same posture when obtaining the multiple arm positions. In other words, the probe tool 210 should be placed in a same orientation. Supposing the arm positions are represented in a format of (x, y, z, pitch, yaw, roll) with six degrees of freedom, the first three components (x, y, z) relate to the x, y and z coordinate value in the position, and the last three components (pitch, yaw, roll) relate to three rotation angles (the pitch, the yaw and the roll angles) in the rotation. Reference will be made to FIG. 4A for more details for obtaining the multiple arm positions. FIG. 4A illustrates a schematic diagram 400A for obtaining a plurality of arm positions of a robot arm in accordance with embodiments of the present disclosure. In FIG. 4A, the probe tool 210 may be placed on the surface of the calibration object 220 at multiple arm positions 230, 232, 234 and 236. For example, the engineer may move the probe tool 210 and make the ball probe 212 to touch the surface at various positions while keep the posture of the probe tool 210 unchanged. In other words, the orientation (pitch, yaw, roll) of the probe tool 210 remains unchanged during obtaining the multiple arm positions 230, 232, 234 and 236.

Once the probe tool 210 is placed at a position on the surface, a corresponding arm position may be read from the robot system. When the arm positions are represented in the six degrees of freedom, the arm position 230 may be represented as $(x_1, y_1, z_1, pitch, yaw, roll)$, the arm position 232 may be represented as $(x_2, y_2, z_2, pitch, yaw, roll)$, the arm position 234 may be represented as $(x_3, y_3, z_3, pitch, yaw, roll)$, and the arm position 236 may be represented as $(x_4, y_4, z_4, pitch, yaw, roll)$.

It is to be understood that the probe tool 210 may include various types. In some embodiments, the probe tool 210 may be a common probe that triggers a collection for the arm position based on a position change of the probe. At this point, the above four arm positions may be collected when the probe tool 210 is moved on the surface of the calibration object 220. In some embodiments, the probe tool 210 may be an electrode probe that triggers a collection for the arm position when the electrode probe is connected to an electronic conductor. At this point, the calibration object 220 should be made from electronic conductor materials, so as to allow the arm positions to be collected. In other embodiments, the probe tool 210 may include other types of probes that have developed and/or to be developed in the future.

Referring back to FIG. 3, at a block 320, a center 410 of the calibration object 220 is determined based on the plurality of arm positions. When the probe tool 210 is placed at various positions on the surface of the calibration object 220, a center of the ball probe 212 resides at a circle 412 centered at the center 410 of the calibration object 220, and a radius of the circle 412 equals to a sum of a radius of the calibration object 220 and a radius of the ball probe 212. Therefore, the center 410 may be calculated based on a geometry relationship between the surface of the calibration object 220 and a shape of the calibration object 220.

In FIG. 4A, the calibration object 220 is in a ball shape, supposing the center 410 is represented as $(a_1, a_2, a_3)$, a radius of the circle 412 is represented as r, and a center of the ball probe 212 at the circle 412 is represented as $(x, y, z)$, then Formula (1) indicates a geometry relationship between the ball shape and the surface (where: $a_1$, $a_2$, $a_3$ and r are unknown):

$$(x-a_1)^2 + (y-a_2)^2 + (z-a_3)^2 = r^2 \qquad \text{Formula (1)}$$

Further, Formula (1) may be subjected to mathematical transformations as below to obtain the following Formulas (2)-(3):

$$x^2 - 2xa_1 + a_1^2 + y^2 - 2ya_2 + a_2^2 + z^2 - 2za_3 + a_3^2 = r^2 \qquad \text{Formula (2)}$$

$$-2xa_1 - 2ya_2 - 2za_3 + \left(a_1^2 + +a_2^2 + a_3^2 - r^r\right) = -\left(x^2 + y^2 + z^2\right) \qquad \text{Formula (3)}$$

Based on Formula (4), Formula (3) may be converted to Formula (5), and then converted to Formula (6) in a matrix format.

$$b_1 = 2a_1,\, b_2 = 2a_2,\, b_3 = 2a_3,\, b_4 = 2a_1^2 + +a_2^2 + a_3^2 - r^2 \qquad \text{Formula (4)}$$

$$-xb_1 - yb_2 - zb_3 + b_4 = -\left(x^2 + y^2 + z^2\right) \qquad \text{Formula (5)}$$

$$\begin{bmatrix} -x & -y & -z & 1 \end{bmatrix} \begin{bmatrix} b_1 \\ b_2 \\ b_3 \\ b_4 \end{bmatrix} = -\left(x^2 + y^2 + z^2\right) \qquad \text{Formula (6)}$$

As the center of the ball probe 212 at the circle 412 is represented as $(x, y, z)$, the obtained arm positions 230, 232, 234 and 236 may be introduced into Formula (6) to obtain a matrix A in Formula (7) and a matrix B in Formula (8):

$$A = \begin{bmatrix} -x_1 & -y_1 & -z_1 & 1 \\ -x_2 & -y_2 & -z_2 & 1 \\ -x_3 & -y_3 & -z_3 & 1 \\ -x_4 & -y_4 & -z_4 & 1 \end{bmatrix} \qquad \text{Formula (7)}$$

$$B = \begin{bmatrix} -\left(x_1^2 + y_1^2 + z_1^2\right) \\ -\left(x_2^2 + y_2^2 + z_2^2\right) \\ -\left(x_3^2 + y_3^2 + z_3^2\right) \\ -\left(x_4^2 + y_4^2 + z_4^2\right) \end{bmatrix} \qquad \text{Formula (8)}$$

Based on a matrix transformation principle, there are the following Formulas (9)-(11):

$$Ab = B \qquad \text{Formula (9)}$$

$$A^T Ab = A^T B \qquad \text{Formula (10)}$$

$$b = \left(A^T A\right)^{-1} A^T B \qquad \text{Formula (11)}$$

Here, members in the above matrix A and B have known values, and thus unknown values $b_1$, $b_2$, $b_3$ and $b_4$ in the matrix b may be calculated based on Formula (11). Accordingly, the unknown $a_1$, $a_2$, $a_3$ and r may be determined from the above arm positions 230, 232, 234, and 236. With these embodiments, in order to calibrating the probe tool 210, it is unnecessary to align the probe tool 210 to the sharp tip of the conventional calibration object 140 for collecting reference positions. Instead, the probe tool 210 may be placed at desired positions on the surface of the calibration object 220, and then the center 410 of the calibration object 220 may be used for determining the reference positions. Here, the probe tool 210 may be placed at any positions on the surface, and then the complex calibration procedure that requires experienced engineers' manual operations may be improved by a computing procedure based on the geometry relationship between the surface and the shape of the calibration object.

Referring back to FIG. 3, at a block 330, a reference position of the robot arm is generated for calibrating the tool based a position of the center and the posture. Here, the reference position includes two portions: components related to the position (such as $(x, y, z)$) and components related to the rotation (such as (pitch, yaw, roll)). FIG. 4B illustrates a schematic diagram 400 for generating a reference position for calibrating a tool in accordance with embodiments of the present disclosure. In FIG. 4B, a reference position 420 is determined from the arm positions 230-236. Here, the reference position 420 is a simulation position for simulating that a center of the ball probe 212 is placed at the center 410 of the calibration object 220 under the posture (pitch, yaw, roll).

In some embodiments, components in the reference position 420 related to positions may be determined based on the position of the center, and components in the reference position 420 related to rotations may be determined based on rotations parameters of the robot arm. Specifically, the reference position 420 may be represented as ($a_1$, $a_2$, $a_3$, pitch, yaw, roll), and all of the above six symbols have known values. With these embodiments, all the components in the reference position 420 may be determined based on mathematical calculations in an easy and effective way without any manual operation.

Although FIG. 4A illustrates four arm positions, more or less arm positions may be read from the robot system 200 for further processing. For example, five or more arm positions may be obtained and these arm positions may be used to determining the centers of the calibration object 220, as more arm positions are collected for determining the final center, the final center may be calculated based on more measurements. It can reduce the influence of measurement error on the final result due to certain points.

The above paragraphs have described embodiments for obtaining one reference position. With the described embodiments, the calibration object 220 that has a surface is provided for calibration, and thus the to-be-calibrated tool may be easily placed on the surface of the calibration object 220 for collecting more reference positions. Compared with the conventional solution for aligning a tool tip to a sharp tip of the calibration tool, operations of the engineer may be simplified and it does not require a high operating accuracy for the engineer. Therefore, engineers that do not have deep knowledge for calibration may also implement the calibration procedure independently.

Figure 5:
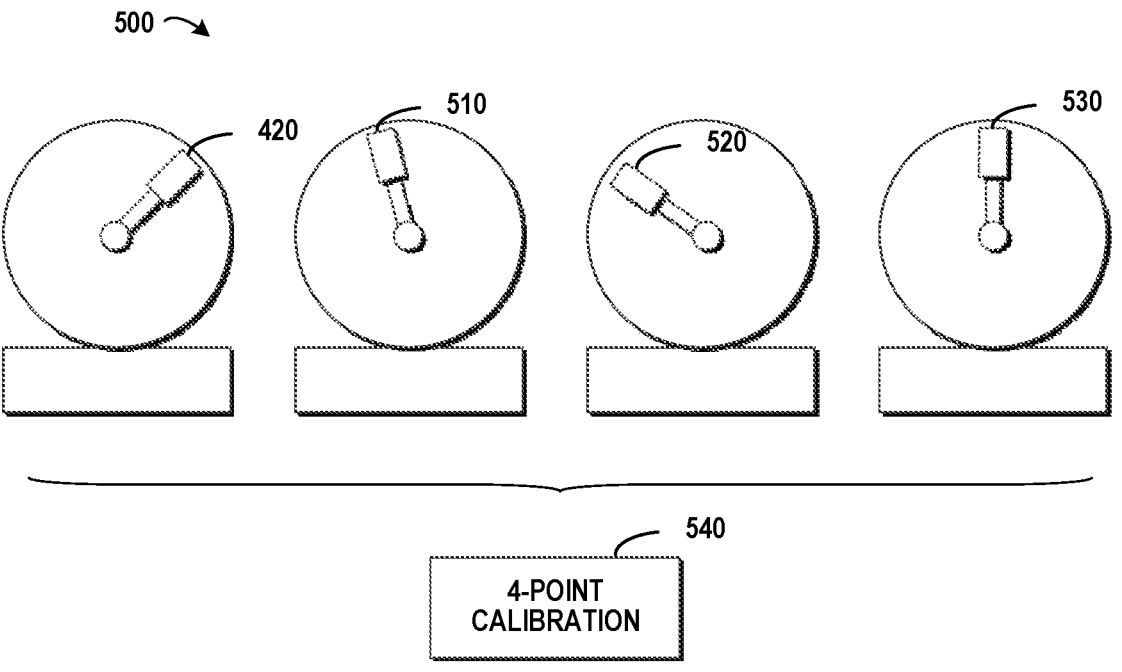
FIG. 5 illustrates a schematic diagram for calibrating a tool based on a plurality of reference positions in accordance with embodiments of the present disclosure.

In some embodiments, the above method 300 may be implemented in multiple times so as to determine multiple reference positions for calibrating the probe tool 210. Reference will be made to FIG. 5 for more details for the calibration procedure, here FIG. 5 illustrates a schematic diagram 500 for calibrating a tool based on a plurality of reference positions in accordance with embodiments of the present disclosure. In FIG. 5, beside the reference position 420, the above method 300 may be implemented to determine other reference positions 510, 520 and 530. Here, each of the reference positions 420, 510, 520 and 530 has a unique posture, and then the four reference positions have the same position and different rotations in the six degree of freedom. At this point, the four reference positions may be subjected to the four-point-calibration 540 for calibrating the probe tool 210.

With these embodiments, multiple reference positions (for example, four or more) may be generated by placing the tool on the surface of the calibration object under multiple postures, respectively. Therefore, the multiple reference positions may be used for calibrating the tool. Compared with the conventional solutions for placing the tool exactly at the sharp tip of the calibration tool under multiple postures respectively, these embodiments may obtain the reference positions and calibrating the tool with simple manual operations accurately.

Figure 6:
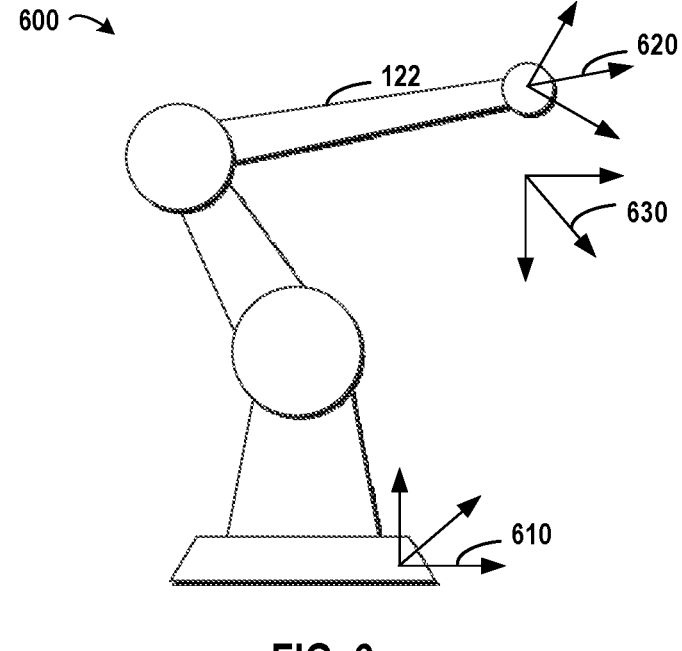
FIG. 6 illustrates a schematic diagram of a relationship between multiple coordinates in the robot system in accordance with embodiments of the present disclosure.

In some embodiments, a transformation relationship between an arm coordinate of the robot arm and a TCP coordinate of the robot system 200 may be determined based on the plurality of reference positions. FIG. 6 illustrates a schematic diagram 600 of a relationship between multiple coordinates in the robot system 200 in accordance with embodiments of the present disclosure. As illustrated in FIG. 6, a base coordinate 610 is related to the base of the robot system 200, an arm coordinate 620 is a coordinate for a flange of the arm 122 (also called as the tool0 coordinate), and a TCP coordinate 630 is a representation in the arm coordinate 620.

In some embodiments, in order to determine the transformation relationship, an equation may be generated based on a geometry relationship among the arm coordinate 620, the TCP coordinate 630, and the base coordinate 610 of the robot system 200. Then, the transformation relationship may be determined by solving the equation. Specifically, the following Formula (12) exists in the robot system 200:

$$T_{BE_i} \cdot T_{E_i T} = T_{BT} \qquad \text{Formula (12)}$$

In Formula (12), $T_{BE_i}$ represents the $i^{th}$ (i=0, 1, 2, 3) reference position and may be replaced with a corresponding one in the reference positions 420, 510, 520 and 530 as determined from the above paragraphs. $T_{E_i T}$ represents the transformation relationship and $T_{BT}$ represents a relationship between the base coordinate and the TCP coordinate, where $T_{E_i T}$ and $T_{BT}$ are unknown. Formula (12) may be converted into Formula (13) in an RT matrix format:

$$\begin{bmatrix} R_{BE_i} & t_{BE_i} \\ 0 & 1 \end{bmatrix}\begin{bmatrix} R_{E_i T} & t_{E_i T} \\ 0 & 1 \end{bmatrix} = \begin{bmatrix} R_{BT} & t_{BT} \\ 0 & 1 \end{bmatrix} \qquad \text{Formula (13)}$$

Formula (13) may be expanded and then Formula (14) may be obtained based on the last column in the expanded formula:

$$R_{BE_i} \cdot t_{E_i T} + t_{BE_i} = t_{BT} \qquad \text{Formula (14)}$$

When the above reference positions 420, 510, 520 and 530 are introduced into Formula (14), Formula (15) may be obtained:

$$\begin{aligned} R_{BE_1} \cdot t_{E_1 T} + t_{BE_1} &= R_{BE_2} \cdot t_{E_2 T} + t_{BE_2} \qquad \text{Formula (15)} \\ &= R_{BE_3} \cdot t_{E_3 T} + t_{BE_3} \\ &= R_{BE_4} \cdot t_{E_4 T} + t_{BE_4} \end{aligned}$$

Further, by moving expressions from the right side to the left side of "=," Formula (15) may be converted to in a matrix format as Formula (15):

$$\begin{bmatrix} R_{BE_1} - R_{BE_2} \\ R_{BE_2} - R_{BE_3} \\ R_{BE_3} - R_{BE_4} \end{bmatrix} \cdot t_{ET} = \begin{bmatrix} T_{BE_2} - T_{BE_1} \\ T_{BE_3} - T_{BE_2} \\ T_{BE_4} - T_{BE_3} \end{bmatrix} \qquad \text{Formula (16)}$$

Therefore, the unknown $t_{ET}$ may be determined based on the least square method and then the transformation relationship may be determined. With these embodiments, the technical problem of determining the transformation relationship is converted into a mathematic problem for solving the unknown parameters in Formula (16). Here, the equation may be easily solved by a least square method and then the transformation relationship may be determined in a fast and effective way.

Although the above formulas illustrate that the transformation relationship is determined from four reference positions, more reference positions may be generated for further processing. For example, five or more reference positions may be generated and these reference positions may be used for creating two groups (each group includes four reference positions) for implementing the four-point-calibration individually. Further, two transformation relationships may be obtained to determine a final result. With these embodiments, the final result may be calculated based on more measurements based on a statistical result so as to reduce errors caused by the manual operation.

In some embodiments, the probe tool 210 may be calibrated based on the determined transformation relationship, thereby the probe tool 210 may be calibrated in an easy and effective way by inputting the determined transformation relationship into the robot system 200 as the calibration parameter. Afterwards, the calibrated probe tool 210 may work in an accurate way for determining a dimension of a target object. With these embodiments, the probe tool 210 may be calibrated accurately and effectively, and then it may measure an accurate dimension of the target object.

Figure 7:
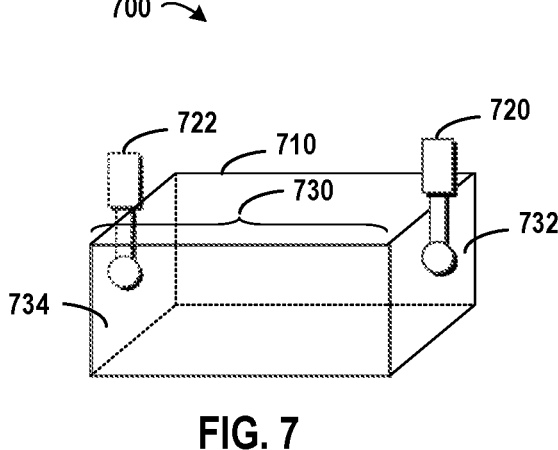
FIG. 7 illustrates a schematic diagram for determining a dimension of a target object with a tool in accordance with embodiments of the present disclosure.

FIG. 7 illustrates a schematic diagram 700 for determining a dimension of a target object with a tool in accordance with embodiments of the present disclosure. As illustrated in FIG. 7, a target object 710 (such as a cuboid) may be placed in the robot system 200 and a distance 730 between two opposite faces 732 and 734 in the target object 710 may be measured by the probe tool 210. In order to measure the distance 730, the probe tool 210 may be placed in a position 720 and other two positions for making the ball probe 212 to touch three non-collinear points in the face 732 of the target object 710 respectively, so as to detect a first position of the face 732. Next, the probe tool 210 may be placed in a position 722 and other two positions for making the ball probe 212 to touch three non-collinear points in the face 734 of in the target object 710 respectively, so as to detect a second position of the face 734. Then, the distance 730 of the target object 710 may be determined based on an offset between the first position and the second position. With these embodiments, due to both of the first and second positions are accurate positions measured by the calibrated probe tool, the dimension that is determined from the first and second position directly.

Figures 8A, 8B:
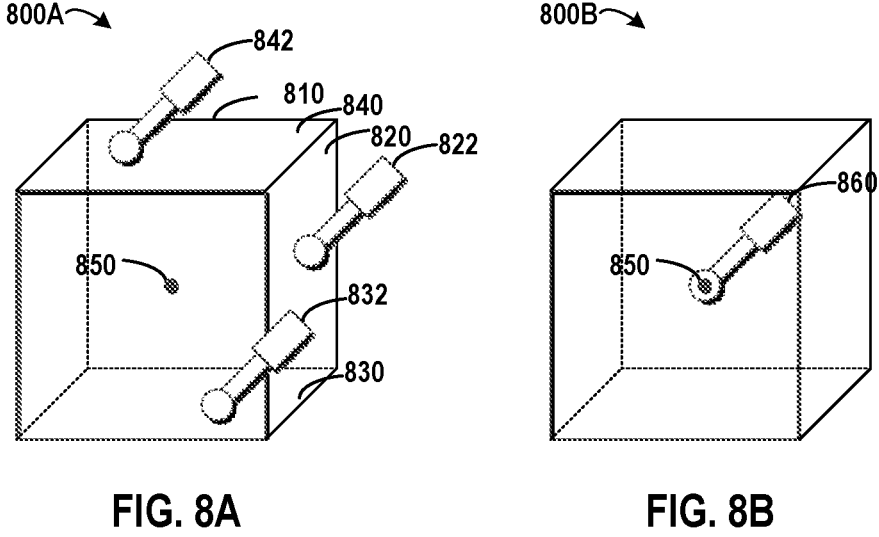
FIG. 8A illustrates a schematic diagram for obtaining a plurality of arm positions of a robot arm in accordance with embodiments of the present disclosure.
FIG. 8B illustrates a schematic diagram for generating a reference position of the robot arm in accordance with embodiments of the present disclosure.

Although the above paragraphs have described embodiments of the present disclosure by taking a spherical calibration object as an example, the calibration object may include other shapes such as a cylinder, a cube, a cuboid, a cone, and a polyhedron, and the like. In some embodiments of the present disclosure, the number of the plurality of arm positions may be determined based on the shape of the calibration object. Reference will be made to FIGS. 8A and 8B for more details when a cube calibration object is used in the calibration procedure.

FIG. 8A illustrates a schematic diagram 800A for obtaining a plurality of arm positions of a robot arm in accordance with embodiments of the present disclosure. In FIG. 8A, a cube 810 having six faces may be provided as the calibration object. At this point, the probe tool 210 may be placed a portion or all of the six faces for determining a center 850 of the cube 810. For example, the probe tool 210 may be placed on a top face 840 with an arm position 842, on a down face 830 with an arm position 832, . . . , and on a right face 820 with an arm position 822, respectively. As the cube 810 has a fixed edge length and distances between opposite faces equal to the edge length, the center 850 may be calculated easily and details are omitted hereinafter. FIG. 8B illustrates a schematic diagram 800B for generating a reference position of the robot arm in accordance with embodiments of the present disclosure. In FIG. 8B, the position of the center 850 and the posture related to the multiple arm positions 822, 832, . . . , and 842 may be used for generating a reference position 860. Further, the probe tool 210 may be place on the faces of the cube 810 with other postures and then more reference positions may be obtained for calibrating the probe tool 210.

With these embodiments, the calibration object may be manufactured in various shapes. For example, a calibration object with an appropriate shape may be selected according a surrounding area of the working environment of the robot system 200, and then the calibration procedure may be adjusted based on the shape of the calibration object. Therefore, the various shapes may provide more flexible choices for the tool calibration.

Although the above paragraphs have described embodiments of the present disclosure by deploying the probe tool 210 at the end arm 122 in the robot system 200 and deploying the calibration object 220 at a fixed position in the robot system 200, the probe tool 210 may also be deployed at a fixed position in the robot system 200, and the calibration object 220 may be deployed at the end arm 122 in the robot system 200. In other words, the tool may be deployed at any of the robot arm and a fixed positon associated with the robot system 200, and the calibration object may be deployed at the other of the robot arm and the fixed position. With these embodiments, the calibration object may be deployed at a tip of the robot arm or a fixed position in the robot system based on a specific environment of the robot system. Therefore, multiple choices are provided for calibrating the tool.

Although the above paragraphs have described embodiments of the present disclosure by taking the probe tool 210 as an example for the tool 130, the tool 130 may also include other types such as a cutting tool for shaping the target object into desired dimensions. At this point, a fixed point (such as a tip of a blade of the cutting tool) of the cutting tool may be placed on the surface of the calibration object 220 for collecting multiple reference positions. Then, the four-point-calibration procedure may be implemented for calibrating the cutting tool, such that the cutting tool may operate in an accurate way.

Figure 9:
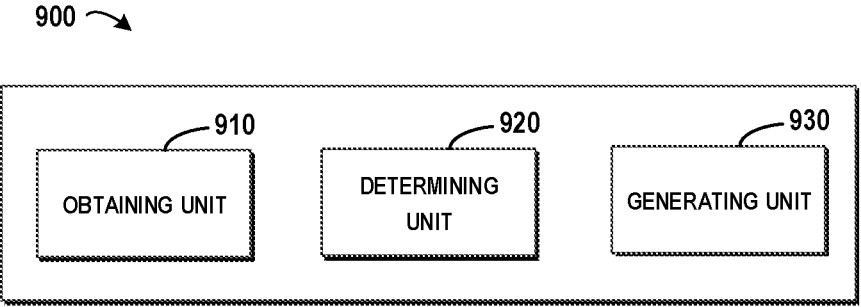
FIG. 9 illustrates a schematic diagram of an apparatus for managing a tool in a robot system in accordance with embodiments of the present disclosure.

The preceding paragraphs have provided detailed steps of the method 300, in other embodiments of the present disclosure, the method 300 may be implemented by an apparatus. FIG. 9 illustrates a schematic diagram of an apparatus 900 for managing a tool in a robot system in accordance with embodiments of the present disclosure. Here, the apparatus 900 comprises: an obtaining unit 910, configured for obtaining a plurality of arm positions of a robot arm of the robot system when the tool is placed under a posture on a surface of a calibration object for calibrating the tool, the posture representing rotation parameters of the robot arm; a determining unit 920, configured for determining a center of the calibration object based on the plurality of arm positions; and a generating unit 930, configured for generating a reference position of the robot arm for calibrating the tool based a position of the center and the posture.

In some embodiments of the present disclosure, the determining unit 920 is further configured for: determining the center of the calibration object based on a geometry relationship between the surface of the calibration object and a shape of the calibration object.

In some embodiments of the present disclosure, the shape of the calibration object comprises any of a ball, a cylinder, a cube, a cuboid, a cone, and a polyhedron, and the obtaining unit 910 is further configured for: determining the number of the plurality of arm positions based on the shape of the calibration object; and obtaining the plurality of arm positions based on the determined number.

In some embodiments of the present disclosure, the generating unit 930 is further configured for: generating components in the reference position related to positions based on the position of the center; and generating components in the reference position related to rotations based on rotations parameters of the robot arm.

In some embodiments of the present disclosure, the generating unit 930 is further configured for generating a plurality of reference positions; and the apparatus 900 further comprises: a transformation relationship determining unit, configured for determining, based on the plurality of reference positions, a transformation relationship between an arm coordinate of the robot arm and a Tool Center Position (TCP) coordinate of the robot system.

In some embodiments of the present disclosure, the transformation relationship determining unit is further configured for: generating an equation based on a geometry relationship among the arm coordinate, the base coordinate and the transformation relationship based on the plurality of reference positions; and determining the transformation relationship by solving the equation.

In some embodiments of the present disclosure, the apparatus 900 further comprises: a calibrating unit, configured for calibrating the tool based on the transformation relationship.

In some embodiments of the present disclosure, the tool comprises a probe tool and the apparatus further comprises a measuring unit, configured for determining a dimension of a target object with the calibrated tool.

In some embodiments of the present disclosure, the measure unit is further configured for: receiving a first position in the target object and a second position in the target object, respectively; and determining the dimension of the target object based on an offset between the first position and the second position.

In some embodiments of the present disclosure, the tool is deployed at any of the robot arm and a fixed positon associated with the robot system, and the calibration object is deployed at the other of the robot arm and the fixed position.

Figure 10:
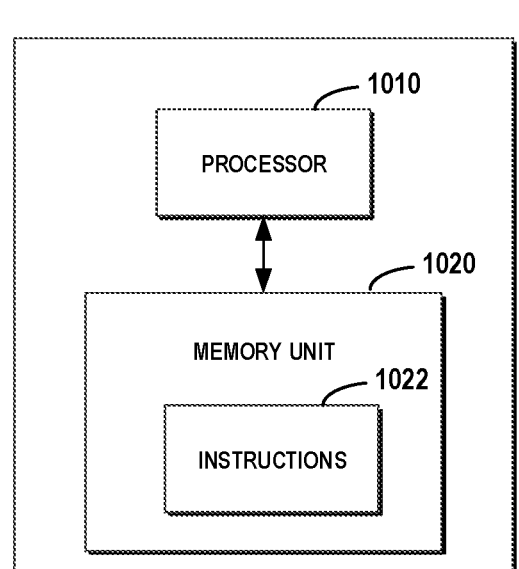
FIG. 10 illustrates a schematic diagram of a system for managing a tool in a robot system in accordance with embodiments of the present disclosure.

In some embodiments of the present disclosure, a system 1000 is provided for managing a tool in a robot system. FIG. 10 illustrates a schematic diagram of the system 1000 for managing a tool in a robot system in accordance with embodiments of the present disclosure. As illustrated in FIG. 10, the system 1000 may comprise a computer processor 1010 coupled to a computer-readable memory unit 1020, and the memory unit 1020 comprises instructions 1022. When executed by the computer processor 1010, the instructions 1022 may implement the method 300 for tuning a robot system as described in the preceding paragraphs, and details will be omitted hereinafter.

In some embodiments of the present disclosure, a computer readable medium for tuning a robot system is provided. The computer readable medium has instructions stored thereon, and the instructions, when executed on at least one processor, may cause at least one processor to perform the method for tuning a robot system as described in the preceding paragraphs, and details will be omitted hereinafter.

In some embodiments of the present disclosure, a computer program product is provided for managing a tool in a robot system. The computer readable medium has instructions stored thereon, and the instructions, when executed on at least one processor, may cause at least one processor to perform the method for tuning a robot system as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a tool in a robot system, comprising:
   obtaining a plurality of arm positions of a robot arm of the robot system when the tool is placed under a posture on a surface of a calibration object for calibrating the tool, the posture representing rotation parameters of the robot arm;
   determining a center of the calibration object based on the plurality of arm positions;
   generating a plurality of reference positions of the robot arm for calibrating the tool based a position of the center and the posture; and
   determining, based on the plurality of reference positions, a transformation relationship between an arm coordinate of the robot arm and a Tool Center Position (TCP) coordinate of the robot system.

2. The method of claim 1, wherein determining the center of the calibration object comprises:
   determining the center of the calibration object based on a geometry relationship between the surface of the calibration object and a shape of the calibration object.

3. The method of claim 2,
   wherein the shape of the calibration object comprises any of a ball, a cylinder, a cube, a cuboid, a cone, and a polyhedron, and
   obtaining the plurality of arm positions comprises:
      determining the number of the plurality of arm positions based on the shape of the calibration object; and
      obtaining the plurality of arm positions based on the determined number.

4. The method of claim 1, wherein generating the plurality of reference positions of the robot arm comprises:
   generating components in the plurality of reference positions related to positions based on the position of the center; and
   generating components in the plurality of reference positions related to rotations based on rotations parameters of the robot arm.

5. The method of claim 1, wherein determining the transformation relationship comprises:
   generating an equation based on a geometry relationship among the arm coordinate, the TCP coordinate and a base coordinate of the robot system; and
   determining the transformation relationship by solving the equation.

6. The method of claim 5, wherein the tool comprises a probe tool and the method further comprises: determining a dimension of a target object with the calibrated tool.

7. The method of claim 1, further comprising:
   calibrating the tool based on the transformation relationship.

8. The method of claim 7, wherein determining the dimension of the target object comprises:
   receiving a first position in the target object and a second position in the target object, respectively; and
   determining the dimension of the target object based on an offset between the first position and the second position.

9. The method of claim 1, wherein the tool is deployed at any of the robot arm and a fixed position associated with the robot system, and the calibration object is deployed at the other of the robot arm and the fixed position.

10. A system for managing a tool in a robot system, comprising:
   a computer processor coupled to a computer-readable memory unit, the computer-readable memory unit comprising instructions that when executed by the computer processor implements the method according to claim 1.

11. A non-transitory computer readable medium having instructions stored thereon, the instructions, when executed on at least one processor, cause the at least one processor to perform the method according to claim 1.

12. An apparatus for managing a tool in a robot system, comprising:
   an obtaining unit, configured for obtaining a plurality of arm positions of a robot arm of the robot system when the tool is placed under a posture on a surface of a calibration object for calibrating the tool, the posture representing rotation parameters of the robot arm;
   a determining unit, configured for determining a center of the calibration object based on the plurality of arm positions; and
   a generating unit, configured for generating a plurality of reference positions of the robot arm for calibrating the tool based a position of the center and the posture; and
   a transformation relationship determining unit, configured for determining, based on the plurality of reference positions, a transformation relationship between an arm coordinate of the robot arm and a Tool Center Position (TCP) coordinate of the robot system.

13. The apparatus of claim 12, wherein the determining unit is further configured for:
   determining the center of the calibration object based on a geometry relationship between the surface of the calibration object and a shape of the calibration object.

14. The apparatus of claim 13,
   wherein the shape of the calibration object comprises any of a ball, a cylinder, a cube, a cuboid, a cone, and a polyhedron, and the obtaining unit is further configured for:

determining the number of the plurality of arm positions based on the shape of the calibration object; and obtaining the plurality of arm positions based on the determined number.

15. The apparatus of claim 12, wherein the generating unit is further configured for:

generating components in the plurality of reference positions related to positions based on the position of the center; and generating components in the plurality of reference positions related to rotations based on rotations parameters of the robot arm.

16. The apparatus of claim 12, wherein the transformation relationship determining unit is further configured for:

generating an equation based on a geometry relationship among the arm coordinate, the TCP coordinate and a base coordinate of the robot system and determining the transformation relationship by solving the equation.

17. The apparatus of claim 16, further comprising:

a measuring unit, wherein the measuring unit is configured for determining a dimension of a target object with the calibrated tool; and wherein the tool comprises a probe tool.

18. The apparatus of claim 17, wherein the measuring unit is further configured for:

receiving a first position in the target object and a second position in the target object, respectively; and determining the dimension of the target object based on an offset between the first position and the second position.

19. The apparatus of claim 12, further comprising:

a calibrating unit, configured for calibrating the tool based on the transformation relationship.

20. The apparatus of claim 12, wherein the tool is deployed at any of the robot arm and a fixed position associated with the robot system, and the calibration object is deployed at the other of the robot arm and the fixed position.

*   *   *   *   *